3,399,239
POLYSULFHYDRYL BENZENES
Walter Reifschneider, Midland, Mich., assignor to The Dow Chemical Company, Midland, Mich., a corporation of Delaware
No Drawing. Filed Feb. 25, 1966, Ser. No. 529,958
4 Claims. (Cl. 260—609)

The present invention is directed to insecticidal polysulfhydryl benzene compounds, and is particularly directed to a polysulfhydryl compound consisting of a benzene nucleus substituted with only sulfhydryl groups and from four to six, only, of them.

The novel compounds are crystalline solids appearing yellow in mass, very slightly soluble in water but readily soluble in various common organic solvents such as lower alkanols, benzene, carbon disulfide, and the like. The compounds are useful as insecticides and miticides. They are also rodenticidal. They are useful as intermediates in the preparation of dyestuffs and biologically active materials; they are also of value as substrates to be employed on support substances in chromatographic columns for the resolution of such compounds as low boiling mercaptans and thioethers.

To prepare the compounds, one starts with a polykis (lowalkylthio) benzene in the structure of which there are from four to six, both inclusive, loweralkylthio substituents and they are at the ring sites where it is desired to have sulfhydryl groups.

The polykis(alkylthio)benzenes used as starting materials in the present invention are readily prepared by condensation of the corresponding polybromobenzenes and cuprous salt of the corresponding alkyl mercaptans, at a temperature of 80–180° C. in liquid reaction medium in the presence of a nitrogenous base. The resulting mixture is acidified to obtain a precipitate: the precipitate is extracted with solvent such as chloroform, the extract solution dried, solvent removed by vaporization, and the resulting product distilled or recrystallized if desired, to obtain a polykis(alkylthio)benzene product.

To obtain the desired sulfyhydryl substituents, one cleaves loweralkylthio substituents of the chosen said polykis(loweralkylthio)benzene. In a convenient method, one cleaves these substitutents with alkali metal in liquid ammonia or liquid alkylamine, or mixtures thereof as reaction medium to obtain the intermediate alkali metal polysulfhydryl salt. Thereafter, to recover the desired products from their salt form, one acidifies the resulting intermediate alkali metal compounds. During the first step of the reaction to prepare the present compounds, about 2 atoms of alkali metal react with each loweralkylthio radical. Enough solvent is employed to hold all reactants and reaction products in solution. Upon completion of the first step, solvent ammonia is removed by distillation and the resulting product cautiously treated with acid to displace alkali metal and obtain the pure sulfhydryl compound. The resulting product is then purified in manners which will be evident to skilled chemists in light of the present specification and claims. However, it can often be employed unpurified.

The alkyl of the starting polykis(alkylthio)benzene can be any alkyl: however, for economy in preparation and especially for promptness of reaction, it will be preferred to employ an alkyl of from 1 to 20 carbon atoms, usually from 1 to 4 carbon atoms.

The cleavage reaction goes forward at temperatures over a wide range, but initiates readily at the temperature of liquid ammonia, which can be the boiling temperature of ammonia under atmospheric pressure, or somewhat higher. The reaction can thus be carried out in ammonia, as under reflux or in a pressure vessel. Under these conditions, the reaction goes forward to completion with good yield calculated upon the basis of consumed starting material.

In carrying out the reaction, the alkali metal is dissolved slowly, portionwise, and with stirring, in solvent. The solvent can be ammonia, or a loweralkylamine, or hydrazine. Hydrazine tends to be toxic in this application, and is not preferred. Loweralkylamines, such as methylamine, are more easily liquefied, and may be preferred for this reason: however, they are less satisfactory as solvents and larger amounts may be required. Di- and triloweralkyl amines are poor solvents and are not preferred. Thus the preferred solvents are ammonia and monoloweralkylamines of from 1 to 4, both inclusive, carbon atoms. In at least laboratory preparations, ammonia is the solvent of choice. Ammonia is readily held as a liquid by employing it in a vessel immersed in a bath of acetone and solid carbon dioxide, "Dry Ice."

Because it is effective, reacts at a satisfactory rate, and is the least expensive alkali metal, sodium is preferred.

The polykis(loweralkylthio)benzene reactant may be dissolved in the ammonia after, or preferably before sodium is added. When it is added before sodium is added, the subsequent development of a persisting blue color indicates that a reactive excess, which is sufficient, sodium has been added.

Reaction takes place promptly; reaction times longer than a few minutes are usually unnecessary.

Thereafter ammonium chloride can be added as a dry solid to the ammoniacal reaction mixture to neutralize excess sodium and byproducts of reaction, as is indicated by disappearance of the blue color. Ammonia is then removed by distillation, as by allowing it to evaporate at room temperature to obtain a white to off-white product residue. Most of the ammonia can be recovered for re-use, if desired.

The product residue is then purified. In one way, it is taken up in water and acidified, as with hydrochloric acid to free the polysulfhydryl benzene whereupon usually an oily, immiscible organic product layer typically separates from an aqueous layer. Other acids can be used: carbonic acid tends to react at an undesirably slow rate, and strong sulfuric acid may occasion side reactions that lower yields. Acetic, dilute sulfuric, and hydrohalic acids are preferred, and hydrochloric acid is most satisfactory. Oxidizing acids such as nitric are to be avoided. The resulting organic layer is removed in a separatory funnel, taken up in a solvent which can be ether, and the solution dried, as over anhydrous sodium sulfate: the dried solution is fractionally distilled to remove solvent and, under vacuum, to isolate and purify the desired polysulfhydryl compound.

The following examples illustrate the best mode now known, of practicing the present invention.

Example 1.—1,2,4,5-tetrasulfhydryl benzene

Ammonia is introduced into, and liquefied in a liter flask in an acetone bath chilled by solid carbon dioxide ("Dry Ice"), and equipped with a Dry Ice cooled ammonia reflux condenser to obtain about 300 milliliters liquid ammonia near to its boiling temperature. Into this ammonia is introduced 20 grams (.063 mole) finely powdered 1,2,4,5-tetrakis(ethylthio)benzene. To the resulting dispersion is added an undetermined amount of clean, freshly cut metallic sodium in small portions, with stirring. The addition continues until all components of the mixture are in solution in ammonia and a deep blue color persists.

At this point, powdered ammonium chloride (about 20 grams, approximately .375 mole) is added cautiously, in small portions, until the blue color is permanently destroyed. Thereafter, the ammonia reflux condenser is removed from the flask, and ammonia is permitted to evaporate. When the ammonia has evaporated substantially completely, there remains a white solid. This solid is taken up in water, and the resulting water solution is acidified with hydrochloric acid. As a result of these operations the resulting mixture segregates into an oil organic layer and an aqueous layer. The organic layer is separated and diluted with diethyl ether. The ether solution is dried over anhydrous sodium sulfate and the ether solvent vaporized and removed. The remaining oily product is distilled under declining subatmospheric pressures and at gradually rising temperatures. As a result of these procedures there is obtained a purified 1,2,4,5-tetrasulfhydryl benzene product as an oil which crystallizes upon standing. The product has a molecular weight of 206.36. This is confirmed by mass spectrum analysis, which presents a major quantitative peak indicating a mass-to-charge ratio appropriate for parent ions of molecular weight of 206, together with various other parent ions representing near molecular weights but of smaller amounts. The product is insecticidal and melts at 139–141° C.

Example 2

1,2,4,5-tetrasulfhydryl benzene was dispersed as sole toxicant in water with adjuvants that were biologically innocuous in the employed amounts, to obtain an aqueous dispersion of 500 parts 1,2,4,5-tetrasulfhydrylbenzene per million parts resulting aqueous dispersion.

Similarly, aqueous dispersions were prepared in which, respectively, and as sole toxicant in each, appeared 500 parts of one of 1,2,4-trisulfhydryl benzene and 1,3,5-trisulfhydryl benzene per million parts resulting aqueous dispersion. 1,3,5-trisulfhydryl benzene is described by Adams et al., 81 Journal of the American Chemical Society, 4939–4940. A check preparation was prepared also, containing only water and the adjuvants as used in the toxicant dispersions hereinabove described, in the amounts there employed.

Each of the four preparations was employed, separately, in a test for toxicity to the said insects when contacted with a dense population of bean aphids growing actively on young plants of Tropaeolum, separate but essentially similar plants and groups of aphids being employed for each toxicant, the toxicants were applied in procedures of which all significant aspects were identical and, except for the said check, at the same rate.

The plants and aphids were throughly wetted with the test preparation, but not the soil in which the plants were growing. Thereafter, the plants and aphids were permitted to dry spontaneously under growing conditions favorable to the insects and plants, and observed for a period of time. At the end of about 72 hours, the plants were carefully checked for survival in the aphid population, counts made of any surviving aphids, and the results corrected for natural mortality by Abbott's formula. As a result of these operations, no mortality ascribable to chemical toxicant was observed in the aphid populations treated, severally and respectively, with 1,2,4-trisulfhydryl benzene, 1,3,5-trisulfhydryl benzene or the check group tested with adjuvant dispersion having no polysulfhydryl benzene toxicant. In contrast, there was complete kill, 100 percent with no survivors, in the aphid population treated with the dispersion of 1,2,4,5-tetrasulfhydryl benzene. The test method with each preparation was that of Kenaga, Doty and Hardy: see 55 Journal of Economic Entomology, No. 4, August 1962, pages 466–469.

Example 3

The present example essentially duplicates Example 1, foregoing except that the starting material employed is 1,2,4,5,-tetrakis(methylthio)benzene. Procedural steps and product compound are identical with the foregoing.

Example 4

The present example substantially duplicates Example 1, except that the employed solvent is methylamine. Because of its higher boiling temperature, smaller quantities of solid carbon dioxide are used. However, solubility of reactants and products is lower, so, in the instant example, in approximately $\frac{1}{15}$ molar quantities, one liter methylamine is employed. Acidification is carried out using acetic acid.

Example 5

In procedures essentially the same as those of Example 1, by the employment of hexakis(ethylthio)benzene (melting at 52–54° C.) and a realtively large amount of ammonia solvent, there is obtained a hexasulfhydryl product. Infrared spectrum of the product is consistent with the assigned structure and mass spectrum parent ions having mass to charge ratios corresponding to molecular weight of 270 confirm the formula weight of 270.

Also, from pentakis(butylthio)benzene, there is obtained a pentasulfhydryl benzene product. Mass spectra of the substance present peaks indicating parent ions of mass to charge ratio corresponding to molecular weight of 238 confirming the formula weight of 238.4 and an ebullioscopic determination of molecular weight of 235 plus or minus 5 units of molecular mass.

I claim:

1. Insecticidal polysulfhydryl benzene having from 4 to 6, both inclusive, sulfhydryl groups as sole substituents on the benzene nucleus.

2. Compound of claim 1 having a molecular weight of 206.36 and wherein the sulfhydryl groups are in ring positions 1,2,4 and 5.

3. Compound of claim 1 having a molecular weight of 238.43 and wherein the sulfhydryl groups are in positions 1,2,3,4 and 5.

4. Compound of claim 1 having a molecular weight of 270.5 wherein each benzene carbon atom has one sulfhydryl substituent.

References Cited

Adams et al., "J.A.C.S." vol. 81, pp. 4039–4040 (1959), QDIAS.

CHARLES B. PARKER, *Primary Examiner.*

D. R. PHILLIPS, *Assistant Examiner.*